(12) United States Patent
Ding et al.

(10) Patent No.: US 9,742,789 B2
(45) Date of Patent: Aug. 22, 2017

(54) METHOD, DEVICE AND SYSTEM FOR INTERCEPTING WEB ADDRESS

(71) Applicant: Beijing Qihoo Technology Company Limited, Beijing (CN)

(72) Inventors: Yi Ding, Beijing (CN); Yuan Li, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 12 days.

(21) Appl. No.: 14/766,052

(22) PCT Filed: Jan. 27, 2014

(86) PCT No.: PCT/CN2014/071589
§ 371 (c)(1),
(2) Date: Aug. 5, 2015

(87) PCT Pub. No.: WO2014/121713
PCT Pub. Date: Aug. 14, 2014

(65) Prior Publication Data
US 2015/0381645 A1    Dec. 31, 2015

(30) Foreign Application Priority Data

Feb. 6, 2013    (CN) .......................... 2013 1 0048906

(51) Int. Cl.
*G06F 21/00*    (2013.01)
*H04L 29/06*    (2006.01)
*G06F 21/51*    (2013.01)

(52) U.S. Cl.
CPC .......... *H04L 63/1425* (2013.01); *G06F 21/51* (2013.01); *H04L 63/1441* (2013.01);
(Continued)

(58) Field of Classification Search
CPC ..................... G06F 21/50; G06F 21/55–21/56
(Continued)

(56) References Cited

U.S. PATENT DOCUMENTS 8,127,316 B1 * 2/2012 Binotto .................. G06F 9/545
719/331
2009/0150999 A1    6/2009 Dewey et al.
(Continued)

FOREIGN PATENT DOCUMENTS

CN         101005497         7/2007
CN         101226570         7/2008
(Continued)

*Primary Examiner* — Anthony Brown
(74) *Attorney, Agent, or Firm* — Harness, Dickey & Pierce, P.L.C.

(57) ABSTRACT

Disclosed are a method, device and system for intercepting a web address. The method comprises: triggering an interception program pre-injected in a browser process; the interception program obtaining web address information of a network connection upon detecting a network connection operation, and determining whether the web address information is malicious web address information; and if the web address information is malicious web address information, the interception program instructing the browser process to stop accessing the malicious web address information. The present disclosure can interrupt a connection of a malicious URL in time.

20 Claims, 3 Drawing Sheets

(52) U.S. Cl.
CPC ........ *H04L 63/1466* (2013.01); *H04L 63/168* (2013.01); *G06F 2221/2119* (2013.01)

(58) Field of Classification Search
USPC ..................................................... 726/22–25
See application file for complete search history.

(56) References Cited

U.S. PATENT DOCUMENTS

| | | | |
|---|---|---|---|
| 2014/0053272 A1* | 2/2014 | Lukacs | G06F 21/53 726/24 |
| 2014/0075555 A1* | 3/2014 | Shilimkar | G06F 21/566 726/23 |

FOREIGN PATENT DOCUMENTS

| | | |
|---|---|---|
| CN | 101414997 | 4/2009 |
| CN | 102402620 | 4/2012 |
| CN | 102467633 | 5/2012 |
| CN | 102693395 | 9/2012 |
| CN | 102819703 | 12/2012 |
| CN | 102833258 | 12/2012 |
| CN | 103116723 | 5/2013 |

* cited by examiner

METHOD, DEVICE AND SYSTEM FOR INTERCEPTING WEB ADDRESS

FIELD OF THE INVENTION

The present disclosure relates to the field of computer technologies and particularly to a method for intercepting a web address, a device for intercepting a web address, a system for intercepting a web address, a computer program, and a computer readable medium.

BACKGROUND OF THE INVENTION

Mobile terminals have evolved from simple communicators gradually to become intelligent and thus evolve into intelligent terminal devices, thanks to a plenty of application software along with the emerging era of mobile multimedia. The intelligent terminal devices are so popularized that the devices may be susceptible to attacks of malicious software or malicious web addresses, thus resulting in consumed traffic of the user terminals, balance deductions, and other losses.

Existing security software typically uses an interface attached to a browser of an operating system to judge whether the browser has ever accessed a malicious web address, to thereby intercept the malicious web address. However this interception of the malicious web address can only be applicable to the browser attached to the operating system of the terminal but cannot be applicable to another browser, so that the security software has to force the browser to access again a secured web page after the browser accesses the malicious web address (after a varying period of time, approximately one to three seconds, since the browser accesses the malicious web address), but the user may actually have downloaded a webpage of a malicious website before the browser accesses the secured web page.

Thus it is desirable for those skilled in the art to address the technical problem of providing a mechanism of intercepting a malicious web address in any browser to thereby block the malicious web address from being connected with, in a timely manner.

SUMMARY OF THE INVENTION

In view of the problem above, the disclosure has been made to provide a method for intercepting a web address, and a corresponding device and system, a computer program, and a computer readable medium, which can overcome or at least partly address the problem.

According to an aspect of the disclosure, there is provided a method for intercepting a web address, the method including:
  triggering an interception program pre-injected in a browser process;
  the interception program obtaining web address information of a network connection upon detecting a network connection operation, and determining whether the web address information is malicious web address information; and
  if the web address information is malicious web address information, the interception program instructing the browser process to stop accessing the malicious web address information.

According to another aspect of the disclosure, there is provided a device for intercepting a web address, the device including:
  a triggering module configured to trigger an interception program pre-injected in a browser process;
  a determining module in the interception program, configured to obtain web address information of a network connection upon detecting a network connection operation, and to determine whether the web address information is malicious web address information; and
  a stopping module in the interception program, configured, if the web address information is malicious web address information, to instruct the browser process to stop accessing the malicious web address information.

According to another aspect of the disclosure, there is provided a system for intercepting a web address, the system including:
  the triggering module is configured to trigger an interception program pre-injected in a browser process; and
  the intercepting module is configured to obtain web address information of a network connection upon detecting a network connection operation, to determine whether the web address information is malicious web address information, and if yes, to instruct the browser process to stop accessing the malicious web address information; otherwise, to instruct the browser process to access the malicious web address information.

According to another aspect of the disclosure, there is provided a computer program including computer readable codes which upon being executed on a mobile terminal cause the mobile terminal to perform the method for intercepting a web address according to any one of claims 1 to 10.

According to another aspect of the disclosure, there is provided a computer readable medium with the computer program stored thereon.

Advantageous effects of the disclosure are as follows:

A method, device, and system for intercepting a web address according to the disclosure can inject the interception program by obtaining the advanced privilege of the operating system of the mobile terminal, upon detecting that the operating system is adjusted in privilege, and use the interception program to monitor and intercept web address information to be accessed by any browser process, and determine whether the web address information is malicious web address information, if yes, redirect or block the malicious web address information. Thereby the problems in the prior art are addressed, which are intercepting only an access address for the browser attached to the operating system of the mobile terminal, and failing to intercept the web address in a timely manner. Thereby the advantageous effects are achieved, which are supporting the interception of the accessed web addresses of all of browsers, and intercepting malicious web address information in a timely manner, so as to secure a network access of the user.

Only the summary of the technical solution of the disclosure has been described above, and particular embodiments of the disclosure will be described below in order to enable the technical solution of the disclosure to become more apparent and to be put into practice in light of the disclosure of the description, and in order to make the foregoing and other objects, features and advantages of the disclosure more apparent.

BRIEF DESCRIPTION OF DRAWINGS

Various other advantages and benefits will become apparent to those ordinarily skilled in the art upon review of the following detailed description of preferred embodiments. The drawings are merely intended to illustrate the preferred embodiments but not to limit the disclosure. Like components will be denoted with like reference numerals throughout the drawings in which.

DETAILED DESCRIPTION OF THE INVENTION

Figure 1:
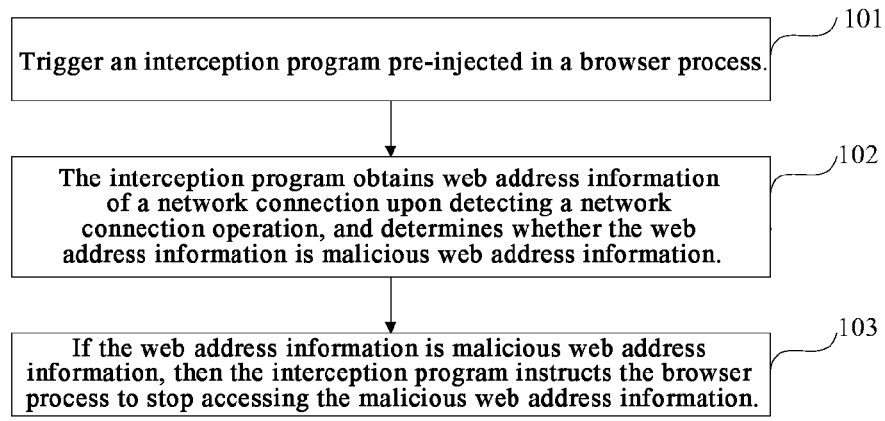
FIG. 1 illustrates schematically a flow diagram of steps in a first embodiment of a method for intercepting a web address according to an embodiment of the disclosure.

Exemplary embodiments of the disclosure will be described below in further details with reference to the drawings. Although the exemplary embodiments of the disclosure are illustrated in the drawings, it shall be appreciated that the disclosure can be embodied in various forms but will not be limited to the embodiments described here. On the contrary these embodiments are provided so that the disclosure can become more apparent and the scope of the disclosure can be conveyed fully to those skilled in the art.

One of core ideas of the embodiments of the disclosure lies in that if it is detected that an operating system of a mobile terminal has been adjusted in privilege or has a manufacturer preset privilege, then an advanced privilege of the operating system is obtained and an interception program is injected to enhance interception of a network request of the operating system so as to detect and intercept the network request in a timely manner.

Referring to FIG. 1, there is illustrated a flow diagram of steps in a first embodiment of a method for intercepting a web address according to an embodiment of the disclosure, and the principle of the disclosure will be described in this embodiment by way of an example in which there is a smart terminal configured with the Android system, while this description is merely exemplary, the scope of the disclosure will not be limited thereto, and the principle of the disclosure can also be applicable to a smart terminal configured with another operating system (e.g., Linux, iOS, Window Phone, Symbian, etc.), where the method can particularly include the following steps:

The step 101 is triggering an interception program pre-injected in a browser process.

With regard to the operating system, the operating system classifies users into six groups and grants a different operating privilege to each group, orderly which are a group of administrators (Administrators), a group of power users (Power Users), a group of normal users (Users), a group of backup operators (Backup Operators), a group of replicators (Replicator), and a group of guests (Guests), wherein the group of backup operators and the group of replicators are set to maintain the system and will be inactive normally. In addition to the six default privilege groups mentioned above, there are some special privilege members in the operating system, which are set for special purposes, and respectively which are System, Everyone, Creator Owner, etc. All of the special member will not be absorbed by any inbuilt user group and will be belonged to totally independent accounts.

Although the users are restricted differently by their privileges, these restrictions will not be separate from each other, and all of them will operate in response to the same instructions, which provide the user with the foundation to Adjust Token Privilege. To "Adjust Token Privilege" refers to an approach in which a user uses various operating system holes and means to break through a privilege level assigned by the operating system, so as to adjust his or her current privilege up by a plurality of levels and even to the administrator level. The privilege is adjusted successfully on the precondition that there is an error in setting by the administrator (for example, the server is not configured with "the lowest privilege") or there is an emerging overflow hole in the industry (for example, the SYSTEM privilege is obtained directly through an SASS overflow), etc. The common means to Adjust Token Privilege include refreshing a cell phone, the Root privilege of the cell phone, breakout of the cell phone, etc.

With regard to a mobile terminal, an operating system of the terminal will be protected strictly by a manufacturer of the mobile terminal while being shipped from a factory, so a normal program cannot obtain any advanced privilege of the operating system, but the advanced privilege can be obtained by taking advantage of a hole of the operating system of the mobile terminal (the topmost privilege of the operating system is obtained upon detecting that the operating system is adjusted in privilege). A privilege management module can be implanted in the mobile terminal with the hole, so that the advanced privilege can be accessed by another program. Alternatively, the advanced privilege can be obtained when the mobile terminal is shipped from the factory, through cooperating with the manufacturer of the terminal.

In fact, a program can be injected into the mobile terminal after the advanced privilege of the mobile terminal is obtained, so that any process of the system can be controlled with the injection technology.

Generally a program (a process) can be injected in three possible solutions:

1. Codes are put into a Dynamic Link Library (DLL) and mapped to a remote process using a Windows hook;
2. Codes are put into a DLL and then mapped to a remote process using CreateRemoteThread and LoadLibrary; and
3. Codes are copied directly into a remote process (using WriteProcessMemory (a system process monitor)) and executed by CreateRemoteThread without using any DDL.

It shall be noted that those skilled in the art can inject the program in any one or more of the program injection solutions above, and the embodiment of the disclosure will not limit it herein.

In the embodiment of the disclosure, the browser process can be any of various browser processes, and when the interception program is injected into the browser process, an existing network control program in the browser process can be replaced with the interception program, wherein the network control program can include networking and network related functions in the operating system of the mobile terminal, e.g., a web address conversion related function, a host address obtaining function, a webpage display initialization function, etc. In a particular implementation, the interception program can be injected by searching for the memory address of the existing network control program in the browser process firstly, and then replacing the memory address of the network control program with the memory address of the preset interception program.

In reality, the interception program can be a dynamic link library intercepting program. There can be various services in the operating system of the mobile terminal, and in the embodiment of the disclosure, the service refers to a browser service. The process in which the browser service operates is positioned in advance in the operating system, and the dynamic link library intercepting program can be loaded at the position of the process (the dynamic link library intercepting program is loaded into the process, in which the service operates, via an Application Programming Interface (API) dlopen (where a dynamic link library is opened in a specified mode) available from the Linux system upon which the Android system is based), and the networking and network related functions in a browser process is replaced with corresponding functions in the dynamic link library intercepting program.

Of course the injection technology is only illustrative, but those skilled in the art can alternatively replace otherwise the connection control program with the interception program, and the embodiment of the disclosure will not be limited in this regard.

It shall be noted that there will be a function to determine whether to intercept a web address in addition to the corresponding functions in the replacing interception program to perform the same functionalities as the corresponding functions in the replaced network control program.

In the step 102, the interception program obtains web address information of a network connection upon detecting a network connection operation, and determines whether the web address information is malicious web address information;

In a preferred example of the embodiment of the disclosure, the web address information to be accessed can be obtained via an interface of the operating interface or in an incoming parameter.

It shall be noted that those skilled in the art can obtain the web address information of the network connection in any manner, and the embodiment of the disclosure will not be limited in this regard.

In a preferred embodiment of the disclosure, the step of determining whether the web address information is malicious web address information can include the following sub-steps:
In the sub-step S11, the interception program matches the web address information with a preset rule library including collected malicious web address information;
In a particular implementation, the preset rule library can be stored in a local server, or the preset rule library can be stored in the network, and the web address information can be matched with the rule library in the network via a network request. In a preferred example of this embodiment, the preset rule library can include the collected malicious web address information.
In the step S12, if there is a match, then it is determined that the web address information is malicious web address information;
In the step S13, if there is no match, then it is determined that the web address information is not malicious web address information.

In the step 103, if the web address information is malicious web address information, then the interception program instructs the browser process to stop accessing the malicious web address information.

In a particular implementation, the interception program in the browser process keeps on monitoring the web address information to be accessed in real time, and if it is monitored that the web address information to be accessed is malicious web address information, then the browser process intercepts the malicious web address information to thereby prevent the malicious web address information from being accessed, in a timely manner while the user has not downloaded any webpage of a malicious website, so as to secure a network access of the user.

In a preferred embodiment of the disclosure, the step 103 can include the following sub-steps:
In the sub-step S21, the interception program generates redirected web address information;
Particularly the malicious web address information can be prevented from being accessed, by replacing the malicious web address information with web address information with a security alarm, that is, the interception program generates the redirected web address information.

In a preferred embodiment of the disclosure, the sub-step S21 can include the following sub-steps:
In the sub-step S211, the interception program obtains a preset webpage address;
In a preferred example of this embodiment, the preset webpage address can be an address of a micro network server started on the mobile terminal. Of course, the address of the micro network server is only an example of the embodiment of the disclosure, but those skilled in the art can adopt another webpage address, and the embodiment of the disclosure will not be limited in this regard.

In the sub-step S212, the interception program obtains preset webpage content.
In the embodiment of the disclosure, the preset webpage contents can be fixed webpage contents stored in a server, so that the webpage contents of each piece of generated web address information to be redirected will be the same.

In the sub-step S213, the interception program generates the redirected web address information, according to the preset webpage address and the preset webpage content, and returns it to the browser process.

In another preferred embodiment of the disclosure, the sub-step S21 can include the following sub-steps:
In the sub-step S21-1, the interception program obtains a preset webpage address;
In the sub-step S21-2, the interception program generates webpage content of an alarm page according to the malicious web address information;
Particularly the interception program generates the webpage content of the redirected alarm page, according to webpage content of the malicious web address, so that the webpage content of each redirected web address information will be different.

In the sub-step S21-3, the interception program generates the redirected web address information, according to the preset webpage address and the webpage content of the alarm page, and returns it to the browser process.

In the sub-step S22, the browser process accesses the redirected web address, according to the redirected web address information.

In a particular implementation, since the original connection control program is replaced, thus changing the original implementation flow, a different result will be generated by logics in which the replaced functions operate. By way of an example, if some function itself is configured to process web address information and to return an address, then web address information of a secured information webpage will be returned after the function is replaced. The browser process will display a security alarm webpage to the user after accessing the web address of the alarm page, wherein the content of the webpage is fixed content, or alarm content related to malicious web address information.

In another preferred embodiment of the disclosure, the step 103 can include the following sub-steps:

In the sub-step S31, the interception program generates web address error information;

Particularly, for some connection control program, when a malicious web address to be accessed cannot be changed by replacing internal information or a return value of the program, all the networking operations can be blocked by having the function return a return value representing a discovered error (return a web address error flag).

In the sub-step S32, the browser process rejects an access to the malicious web address information, according to the web address error information.

Particularly, for the blocked networking, the browser process will not display any webpage contents any more. Moreover the interception program will pop up (or raise) a window to alert the user.

In an embodiment of the disclosure, when the original connection control program is replaced with the interception program, the interception program not only has the respective execution logics of the connection control program, but also gets a determination logic added, thus the browser process can execute the process logic, of the original connection control program, in the interception program to access the web address information normally, upon determining that the web address information is not malicious web address information (secured web address information).

In a further example of this embodiment, the original connection control program can be stored at another preset position of the server, and when the interception program is executed to determine that the web address information is not malicious web address information, the connection control program can be recalled (by jumping to the address where it is stored) to replace the interception program, so that the connection control program can be executed to perform an access to the web address and the subsequent operation.

In order to enable those skilled in the art to better understand the embodiment of the disclosure, the embodiment of the disclosure will be described below by way of an example:

(1) The user opens any webpage browser on the smart cell phone, but the browsing user accidentally accesses a malicious page;

(2) The interception program keeps on real-time detection of whether the accessed web address is a malicious address, and if it is determined that the web address is a malicious web address, then the interception program starts a next-step interception flow;

(3) The interception program decides whether to adopt a logic to stop networking or to redirect the web address, according to a different network function currently triggering the interception;

(4) For blocked networking, the browser process will not display any webpage content any more, and the interception program will pop up (or raise) a window to alert the user; and (5) For redirected networking, the browser process will display a security alarm webpage, where the webpage content is networking related alarm content.

Of course, the example above is merely exemplary, those skilled in the art can alternatively perform the method on an electronic device with another operating system as required in reality, and the disclosure will not be limited in this regard.

Figure 2:
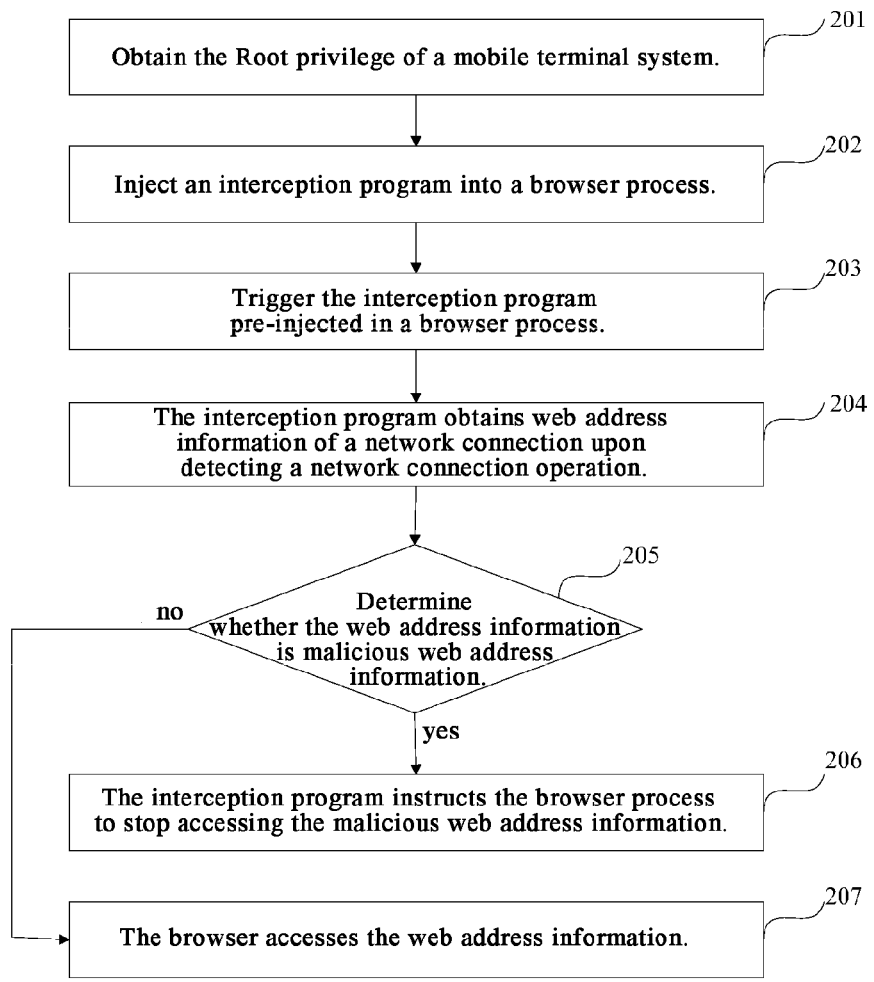
FIG. 2 illustrates schematically a flow diagram of steps in a second embodiment of a method for intercepting a web address according to an embodiment of the disclosure.

Referring to FIG. 2, there is illustrated a flow chart of steps in a second embodiment of a method for intercepting a web address according to an embodiment of the disclosure, where the method can particularly include the following steps:

The step 201 is to obtain the Root privilege of a mobile terminal system;

Particularly the Root privilege is one of system privileges, and can be interpreted as the same concept as the SYSTEM privilege but higher than the Administrator privilege, where Root represents a super administrator user account in the Linux and Unix systems, and after the Root privilege is obtained, it means that the topmost privilege of the mobile terminal has been obtained, and thus any of add, delete, modify and search operations can be performed on any file (including a system file) in the cell phone.

For a mobile terminal, an operating system of the terminal will be protected strictly by a manufacturer of the mobile terminal while being shipped from a factory, so a normal program cannot obtain any advanced privilege of the operating system, but the advanced privilege can be obtained through a hole of the operating system of the mobile terminal (the topmost privilege of the operating system is provided upon detecting that the operating system is adjusted in privilege), and a privilege management module can be implanted in the mobile terminal with the hole, so that the advanced privilege can be accessed by another program. Moreover alternatively the advanced privilege can be obtained when the mobile terminal is shipped from the factory, through cooperating with the manufacturer of the terminal.

The step 202 is to inject an interception program into a browser process;

In an embodiment of the disclosure, the interception program can be injected using the injection technology, and any process of the operating system can be controlled using the injection technology. When the interception program is injected into the browser process, an existing network control program in the browser process can be replaced with the interception program, wherein the network control program can include networking and network related functions in the operating system of the mobile terminal, e.g., a web address conversion related function, a host address obtaining function, a webpage display initialization function, etc. There will be a function to determine whether to intercept a web address in addition to the corresponding functions in the injected interception program to perform the same functionalities as the corresponding functions in the replaced network control program.

In a preferred embodiment of the disclosure, the step 202 can include the following sub-steps:

The sub-step S41 is to search for the memory address of the existing network control program in the browser process; and The sub-step S42 is to replace the memory address of the network control program with the memory address of the preset interception program.

In a particular implementation, the interception program can be injected by searching for the memory address of the existing network control program in the browser process firstly, and then replacing the memory address of the network control program with the memory address of the preset interception program.

The step 203 is to trigger the interception program pre-injected in a browser process.

In a particular implementation, the injected interception program will be started together with the browser process.

In the step 204, the interception program obtains web address information of a network connection upon detecting a network connection operation;

In a preferred example of the embodiment of the disclosure, the web address information to be accessed can be obtained via an interface of the operating interface or in an incoming parameter.

In the step 205, it is determined whether the web address information is malicious web address information; and if yes, then the flow proceeds to the step 206; otherwise, the flow proceeds to the step 207;

In a preferred embodiment of the disclosure, the step of determining whether the web address information is malicious web address information can include:

In the sub-step S51, the interception program matches the web address information with a preset rule library including collected malicious web address information;

In a particular implementation, the preset rule library can include the collected malicious web address information, and the preset rule library can be stored in a local server, or the preset rule library can be stored in the network, and the web address information can be matched with the rule library in the network via a network request.

In the step S52, if there is a match, then it is determined that the web address information is malicious web address information.

In the step S53, if there is no match, then it is determined that the web address information is not malicious web address information.

In the step 206, the interception program instructs the browser process to stop accessing the malicious web address information.

In a particular implementation, the interception program in the browser process keeps on monitoring the web address information to be accessed in real time, and if it is monitored that the web address information to be accessed is malicious web address information, then the browser process intercepts the malicious web address information to thereby prevent the malicious web address information from being accessed, in a timely manner while the user has not downloaded any webpage of a malicious website, so as to secure a network access of the user.

In a preferred embodiment of the disclosure, the step 206 can include the following sub-steps:
In the sub-step S61, the interception program generates redirected web address information;
Particularly, the malicious web address information can be prevented from being accessed, by replacing the malicious web address information with web address information with a security alarm, that is, the interception program generates the redirected web address information.

In a preferred embodiment of the disclosure, the sub-step S61 can include the following sub-steps:
In the sub-step S611, the interception program obtains a preset webpage address;
In the sub-step S612, the interception program obtains preset webpage content;
In the sub-step S613, the interception program generates the redirected web address information, according to the preset webpage address and the preset webpage content, and returns it to the browser process.

In another preferred embodiment of the disclosure, the sub-step S61 can include the following sub-steps:
In the sub-step S61-1, the interception program obtains a preset webpage address;

In the sub-step S61-2, the interception program generates webpage content of an alarm page according to the malicious web address information; and
In the sub-step S61-3, the interception program generates the redirected web address information, according to the preset webpage address and the webpage content of the alarm page, and returns it to the browser process.

In the sub-step S62, the browser process accesses the redirected web address, according to the redirected web address information.

In a particular implementation, since the original connection control program is replaced, thus changing the original implementation flow, a different result will be generated by logics in which the replaced functions operate. By way of an example, if some function itself is configured to process web address information and to return an address, then web address information of a secured information webpage will be returned after the function is replaced. The browser process will display a security alarm webpage to the user after accessing the web address of the alarm page, where the content of the webpage are fixed content, or alarm contents related to malicious web address information.

In another preferred embodiment of the disclosure, the step 206 can include the following sub-steps:
In the sub-step S71, the interception program generates web address error information; and
In the sub-step S72, the browser process rejects an access to the malicious web address information, according to the web address error information.

Particularly if networking is blocked, then the browser process will not display any webpage contents any more. Moreover the interception program will send an alert message (pop up (or raise) a window, etc.,) to alert the user.

In the step 207, the browser accesses the web address information.

Particularly the browser process can execute the process logic, of the original connection control program, in the interception program to access and display the web address information normally, upon determining that the web address information is not malicious web address information (secured web address information).

Since the embodiment of the method in FIG. 2 is substantially the same as the embodiment of the method in FIG. 1, a description thereof has been simplified, and reference can be made to the corresponding description of the embodiment of the method in FIG. 1 for details thereof.

It shall be noted that the respective embodiments of the method have been described as a series of actions in combination for the sake of a simplified description, but those skilled in the art shall appreciate that the disclosure will not be limited to any order of the actions described above, because some of the steps can be performed in another order or concurrently without departing from the scope of the disclosure. Secondly those skilled in the art shall also appreciate that the respective embodiments of the disclosure described in this specification are preferred embodiments, and the actions and the modules involved therein may not be necessarily required for the disclosure.

Figure 3:
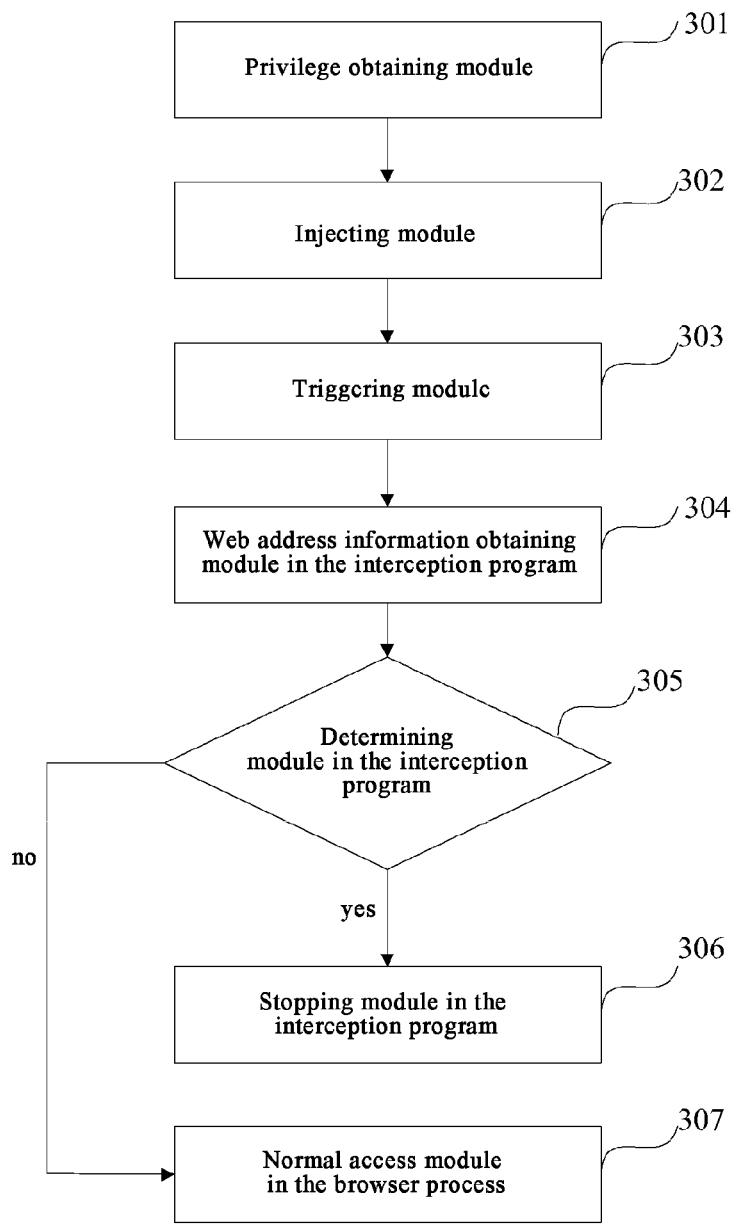
FIG. 3 illustrates schematically a structural diagram of an embodiment of a device for intercepting a web address according to an embodiment of the disclosure.

Referring to FIG. 3, there is illustrated a structural block diagram of an embodiment of a device for intercepting a web address according to an embodiment of the disclosure, where the device can particularly include the following modules:
A privilege obtaining module 301 is configured to obtain a Root privilege of a mobile terminal system;
An injecting module 302 is configured to inject an interception program into a browser process;

In a preferred embodiment of the disclosure, the injecting module 302 can include the following modules:

A memory address searching module is configured to search for the memory address of an existing network control program in the browser process, and A memory address replacing module is configured to replace the memory address of the network control program with the memory address of the preset interception program;

A triggering module 303 is configured to trigger the interception program pre-injected in the browser process;

A web address information obtaining module 304 in the interception program is configured to obtain web address information of a network connection upon detecting a network connection operation; and A determining module 305 in the interception program is configured to determine whether the web address information is malicious web address information; and if yes, to call a stopping module 306 in the interception program; otherwise, to call a normal access module 307 in the browser process;

In a preferred embodiment of the disclosure, the determining module 305 in the interception program can include the following module:

An obtaining module in the interception program is configured to obtain the web address information of the network connection upon detecting the network connection operation, and A matching module in the interception program is configured to match the web address information with a preset rule library including collected malicious web address information; and if there is a match, to determine that the web address information is malicious web address information; otherwise, to determine that the web address information is not malicious web address information; and The stopping module 306 in the interception program is configured to instruct the browser process to stop accessing the malicious web address information.

In a preferred embodiment of the disclosure, the stopping module 306 in the interception program can include the following modules:

A web address redirecting module in the interception program is configured to generate redirected web address information.

In a preferred embodiment of the disclosure, the web address redirecting module in the interception program can include:

A preset web address obtaining unit in the interception program is configured to obtain a preset webpage address;

A preset webpage content obtaining unit in the interception program is configured to obtain preset webpage content;

A redirected web address generating unit in the interception program is configured to generate the redirected web address information, according to the preset webpage address and the preset webpage content, and to return it to the browser process.

In another preferred embodiment of the disclosure, the web address redirecting module in the interception program can include:

A preset web address obtaining unit in the interception program is configured to obtain a preset webpage address;

An alarm webpage content generating unit in the interception program is configured to generate webpage content of an alarm page according to the malicious web address information; and An alarm webpage generating unit in the interception program is configured to generate the redirected web address information, according to the preset webpage address and the webpage content of the alarm page, and to return it to the browser process.

A first access module in the browser process is configured to access the redirected web address, according to the redirected web address information.

In another preferred embodiment of the disclosure, the stopping module 306 in the interception program can include:

A web address error information generating module in the interception program is configured to generate web address error information; and An access rejecting module in the browser process is configured to reject an access to the malicious web address information, according to the web address error information.

An alarming module in the interception program is configured to send an alert message to alert a user, when the web address error information is generated.

The normal access module 307 in the browser process is configured to access the web address information when the interception program determines that the web address information is not malicious web address information.

Since the embodiment of the device in FIG. 3 is substantially the same as the embodiment of the method above, a description thereof has been simplified, and reference can be made to the corresponding description of the embodiment of the method for details thereof.

Figure 4:
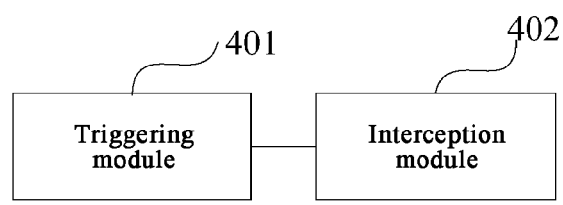
FIG. 4 illustrates schematically a structural diagram of an embodiment of a system for intercepting a web address according to an embodiment of the disclosure.

Referring to FIG. 4, there is illustrated a structural block diagram of an embodiment of a system for intercepting a web address according to an embodiment of the disclosure, and the system can particularly include a triggering module 401 and an intercepting module 402, where:

The triggering module 401 is configured to trigger an interception program pre-injected in a browser process; and The intercepting module 402 is configured to obtain web address information of a network connection upon detecting a network connection operation, to determine whether the web address information is malicious web address information, and if yes, to instruct the browser process to stop accessing the malicious web address information; otherwise, to instruct the browser process to access the web address information.

In a particular implementation, when a network connection related operation is detected, the relevant functions in the interception module will be called by the operating system, and at this time the interception module 402 can obtain the web address information via an operating system related interface or an incoming parameter.

The interception module 402 determines whether the web address information obtained in the previous step is malicious web address information against a local database or in the form of networking.

For malicious web address information, the interception module 402 will return an error flag to the operating system to block a networking action; or the interception module 402 will modify the web address of the malicious web address information to a web address of an alarm webpage, so that the browser process will access the security alarm webpage, wherein the address of the security alarm webpage can be an address of a micro network server started on the terminal, and the content of the security alarm page can be fixed or can be generated automatically from the malicious web address information provided by the interception module. For blocked networking, the browser process will not display any webpage any more, and the interception module 402 will pop up (or raise) a window to alert the user; and for redirected networking, the browser process will display a security alarm webpage, where the content of the webpage is networking related alarm content.

For a secured web address, the interception module 402 will execute normally an original logic of the replaced function, and the browser process will connect normally to the secured web address.

Since the embodiment of the system in FIG. 4 is substantially the same as the embodiment of the method above, a description thereof has been simplified, and reference can be made to the corresponding description of the embodiment of the method for details thereof.

The respective components in the embodiments of the disclosure can be embodied in hardware or in software modules being run in one or more processors or in any combination of both. Those skilled in the art shall appreciate that some or all of the functions of some or all of the components in the device for processing a communication request of a mobile terminal according to the embodiment of the disclosure can be performed in a microprocessor or a Digital Signal Processor (DSP) in practice. The disclosure can also be embodied as a device or apparatus program (e.g., a computer program and a computer program product) for performing a part or all of the method described here. Such a program in which the disclosure is embodied can be stored on a computer readable medium or can be embodied in the form of one or more signals. The signal or signals can be downloaded from a website on the Internet or can be available on a carrier signal or can be provided in any other form.

Figure 5:
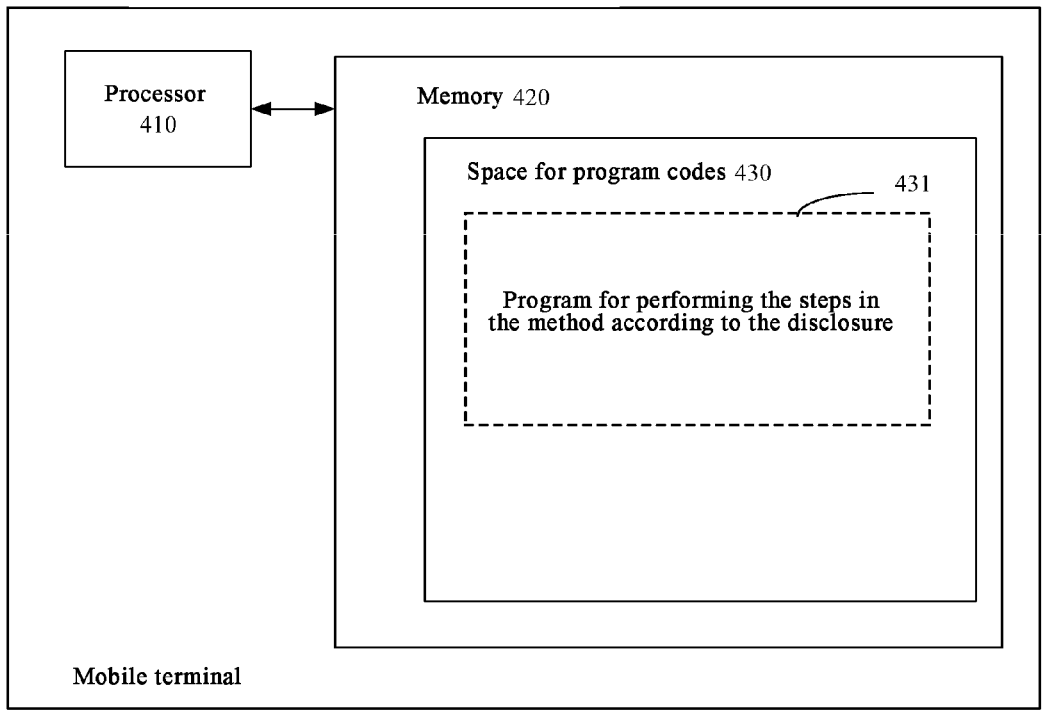
FIG. 5 illustrates schematically a block diagram of a mobile terminal for performing the method according to the disclosure.
Figure 6:
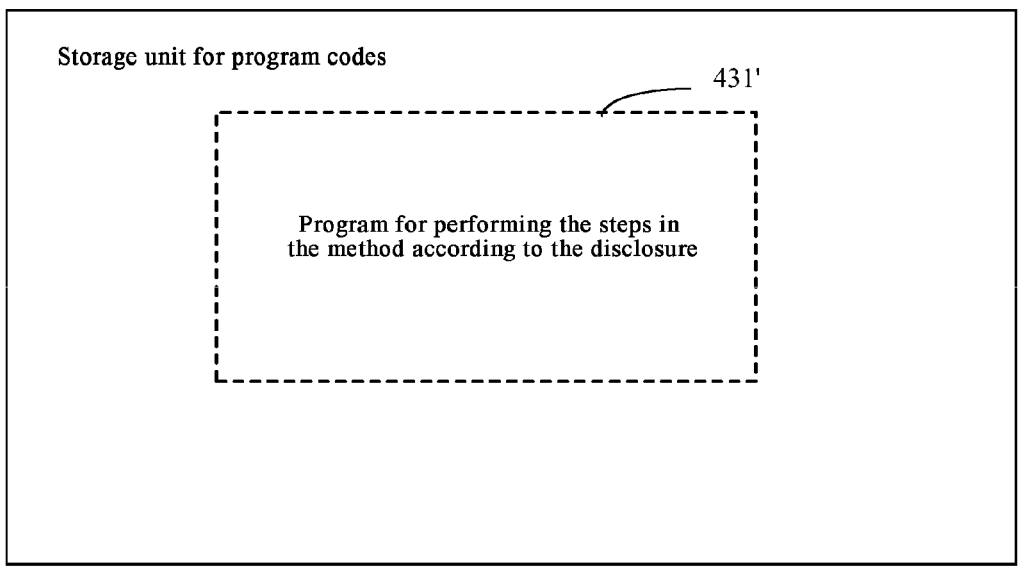
FIG. 6 illustrates schematically a storage unit for holding or carrying program codes to perform the method according to the disclosure.

For example, FIG. 5 illustrates a mobile terminal performing the method according to the disclosure. The mobile terminal traditionally includes a processor 410, and a computer program product or a computer readable medium in the form of a memory 420. The memory 420 can be an electronic memory, e.g., a flash memory, an Electrically Erasable Programmable Read Only Memory (EEPROM), an EPROM, a hard disk, an ROM, etc. The memory 420 is provided with a storage space 430 including for program codes 431 to perform any of the steps in the method above. For example, the storage space 430 for the program codes can include respective program codes 431 for performing the respective steps in the method above respectively. These program codes can be read from or written into one or more computer program products including a program code carrier, e.g., a hard disk, a Compact Disk (CD), a memory card, a floppy disk, etc. The computer program product or products is or are typically a portable or fixed storage unit as illustrated in FIG. 6. The storage unit can be provided with storage segments, a storage space, etc., arranged similarly to the memory 420 in the terminal illustrated in FIG. 5. The program codes can be compressed in an appropriate form, for example. Typically the storage unit includes computer readable codes 431', i.e., codes which can be read by a processor, e.g., the memory 410, etc., and which upon being executed by the terminal cause the terminal to perform the respective steps in the method described above.

"One embodiment", "an embodiment" or "one or more embodiment" as referred to in this context means that a particular feature, structure or characteristic described in connection with the embodiment is included in at least one embodiment of the disclosure. Moreover it shall be noted that the instances of the phrase "in one embodiment" may not necessarily all refer to the same embodiment.

Numerous particular details have been described in the description here. However, it shall be appreciated that the embodiments of the disclosure can be put into practice without these particular details. In some examples, well-known methods, structures and technologies have not bee illustrated in details so as not to obscure understanding of the description.

It shall be noted that the embodiments above are merely for the purpose of illustrating the disclosure but not intended to limit the disclosure, and those skilled in the art can devise alternative embodiments without departing from the scope of the appended claims. Any reference numerals placed between parentheses in the claims shall not be construed as limiting the scope of the disclosure. The term "comprises/comprising" shall not preclude the presence of an element or a step which has not been listed in any claim. The term "a/an" preceding an element shall not preclude the presence of a plurality of such elements. The disclosure can be embodied in hardware including several different elements or in an appropriately programmed computer. In any claim in which several units of a device are listed, several of the units can be embodied particularly in the same item of hardware. The use of the terms "first", "second", "third", etc., shall not suggest any particular order, but these terms can be interpreted as names.

Moreover it shall be noted that the languages used in the description have been selected primarily for the purpose of intelligibility and teaching but not to define or limit the subject of matter of the disclosure. Accordingly numerous modifications and variations will occur to those ordinarily skilled in the art without departing from the scope and spirit of the appended claims. The disclosure of the disclosure is illustrative of but not limiting the scope of the disclosure as defined in the appended claims.

What is claimed is:

1. A computer-executable method for intercepting a web address, the method comprising:
    injecting, by a processor executing instructions stored on one or more non-transitory computer readable media, an interception program into a browser process;
    triggering, by the processor, the interception program pre-injected in the browser process;
    obtaining, by the interception program, web address information of a network connection upon detecting a network connection operation, and determining whether the web address information is malicious web address information; and
    if the web address information is malicious web address information, instructing, by the interception program, the browser process to stop accessing the malicious web address information.

2. The method according to claim 1, wherein injecting the interception program into the browser process comprises:
    searching for a memory address of an existing network control program in the browser process, and
    replacing the memory address of the network control program with a memory address of the interception program.

3. The method according to claim 2, wherein before injecting the interception program into the browser process, the method further comprises:
    obtaining a Root privilege of a mobile terminal system.

4. The method according to claim 1, wherein determining whether the web address information is malicious web address information comprises:
    matching, by the interception program, the web address information with a preset rule library comprising collected malicious web address information; and
    if there is a match, determining that the web address information is malicious web address information;

if there is no match, determining that the web address information is not malicious web address information.

5. The method according to claim 1, wherein instructing, by the interception program, the browser process to stop accessing the malicious web address information comprises:
generating, by the interception program, redirected web address information; and
accessing, by the browser process, the redirected web address according to the redirected web address information.

6. The method according to claim 5, wherein generating, by the interception program, the redirected web address information comprises:
obtaining, by the interception program, a preset webpage address;
obtaining, by the interception program, preset webpage content; and
generating, by the interception program, the redirected web address information according to the preset webpage address and the preset webpage content, and returning it to the browser process.

7. The method according to claim 5, wherein generating, by the interception program, the redirected web address information comprises:
obtaining, by the interception program, a preset webpage address;
generating, by the interception program, webpage content of an alarm page according to the malicious web address information; and
generating, by the interception program, the redirected web address information according to the preset webpage address and the webpage content of the alarm page, and returning it to the browser process.

8. The method according to claim 1, wherein instructing, by the interception program, the browser process to stop accessing the malicious web address information comprises:
generating, by the interception program, web address error information; and
rejecting, by the browser process, an access to the malicious web address information according to the web address error information.

9. The method according to claim 8, further comprising:
sending an alert message to alert a user when the interception program generates web address error information.

10. The method according to claim 1, further comprising:
accessing, by the browser process, the web address information when the interception program determines that the web address information is not malicious web address information.

11. A device for intercepting a web address, the device comprising:
one or more non-transitory computer readable media configured to store computer-executable instructions;
at least one processor to execute a plurality of software modules configured to execute the computer-executable instruction to:
inject an interception program into a browser process;
trigger the interception program pre-injected in the browser process;
obtain web address information of a network connection upon detecting a network connection operation, and determine whether the web address information is malicious web address information; and
if the web address information is malicious web address information, instruct the browser process to stop accessing the malicious web address information.

12. The device according to claim 11, wherein the processor further executes at least one of the software modules configured to execute the computer-executable instruction to:
before the interception program pre-injected in the browser process is triggered, infect the interception program into the browser process, which comprises:
searching for a memory address of an existing network control program in the browser process, and
replacing the memory address of the network control program with a memory address of the interception program.

13. The device according to claim 12, wherein the processor further executes at least one of the software modules configured to execute the computer-executable instruction to:
before the interception program being injected into the browser process, obtain a Root privilege of a mobile terminal system.

14. The device according to claim 11, wherein obtaining web address information of a network connection upon detecting a network connection operation, and determining whether the web address information is malicious web address information comprises:
obtaining the web address information of the network connection upon detecting the network connection operation; and
matching the web address information with a preset rule library comprising collected malicious web address information; and if there being a match, determining that the web address information is malicious web address information; if there is no match, determining that the web address information is not malicious web address information.

15. The device according to claim 11, wherein instructing the browser process to stop accessing the malicious web address information comprises:
generating redirected web address information; and
accessing the redirected web address according to the redirected web address information.

16. The device according to claim 15, wherein generating redirected web address information comprises:
obtaining a preset webpage address;
obtaining preset webpage content; and
generating the redirected web address information according to the preset webpage address and the preset webpage content, and returning it to the browser process.

17. The device according to claim 15, wherein generating redirected web address information comprises:
obtaining a preset webpage address;
generating webpage content of an alarm page according to the malicious web address information; and
generating the redirected web address information according to the preset webpage address and the webpage content of the alarm page, and returning it to the browser process.

18. The device according to claim 11, wherein instructing the browser process to stop accessing the malicious web address information comprises:
generating web address error information; and
rejecting an access to the malicious web address information according to the web address error information.

19. The device according to claim 11, wherein the processor further executes at least one of the software modules configured to execute the computer-executable instruction to:
  access the web address information when the interception program determine that the web address information is not malicious web address information.

20. A non-transitory computer readable recording medium having instructions stored thereon that, when executed by at least one processor, cause the at least one processor to perform a method for intercepting a web address, which comprises:
  injecting an interception program into a browser process;
  triggering the interception program pre-injected in the browser process;
  obtaining, by the interception program, web address information of a network connection upon detecting a network connection operation, and determining whether the web address information is malicious web address information; and
  if the web address information is malicious web address information, instructing, by the interception program, the browser process to stop accessing the malicious web address information.

* * * * *